United States Patent [19]

Hawryluk

[11] Patent Number: 5,126,555
[45] Date of Patent: Jun. 30, 1992

[54] APPARATUS FOR PREVENTING ACCIDENTAL ACTIVATIONS OF OPTO-ELECTRONIC SWITCHES DUE TO EXTRANEOUS LIGHT

[76] Inventor: Joseph C. Hawryluk, P.O. Box 206, Westhampton, N.Y. 11977

[21] Appl. No.: 387,136

[22] Filed: Jul. 31, 1989

[51] Int. Cl.⁵ .............................................. G01V 9/04
[52] U.S. Cl. ............................ 250/221; 250/214 SW; 250/214 B; 340/556
[58] Field of Search ............. 250/214 R, 214 SW, 221, 250/222.1, 214 B; 340/555-557; 361/173

[56] References Cited

U.S. PATENT DOCUMENTS

| | | | |
|---|---|---|---|
| 3,727,207 | 4/1973 | Missio et al. | 340/557 |
| 3,967,111 | 6/1976 | Brown | 250/206 |
| 4,068,222 | 1/1978 | Treviranus | 340/556 |
| 4,507,654 | 3/1985 | Stolarczyk et al. | 340/556 |

Primary Examiner—David C. Nelms
Assistant Examiner—S. Allen

[57] ABSTRACT

An electronic circuit for encoding the emission of radiation generating control systems such as opto-electronic switches to ensure that the radiation they detect, is that of the encoded signal they emit. This is done by testing the received signal at two time intervals; first when the output driver activates the emitter, and again when the emission ceases, to verify the coincidence of the detected signal. If first it proves true and then false, it is considered valid. Optionally, this condition must be met for many consecutive tests in order to enable a valid response. If the detector senses radiation when the emitter is inactive, an anti-coincidence signal is produced to cease further emissions until this condition ends.

6 Claims, 2 Drawing Sheets

APPARATUS FOR PREVENTING ACCIDENTAL ACTIVATIONS OF OPTO-ELECTRONIC SWITCHES DUE TO EXTRANEOUS LIGHT

FIELD OF THE INVENTION

This invention relates in general to opto-electronic switches, and deals in particular with an accesory for reflective type opto-electronic switches.

There are two basic types of opto-electronic switches: the interrupted beam type, and the reflecting beam type. In the interrupted beam type opto-electronic switch, the optical beam is made to travel straight from the emitter to the detector, and the switch is activated by blocking the beam of light. These switches are widely used for intruder detection as well as other object or person sensing applications. In the reflecting beam type switch, the beam issues from the emitter but does not normally impinge on the associated detector because they are not facing each other. This switch is activated by disturbing the facing each other. This switch is activated by disturbing the beam in such a way that it is reflected back towards the detector. This invention relates primarily to these type switches, although it could be adapted to the former type switch.

BRIEF DESCRIPTION OF PRIOR ART

The first reference to a reflecting beam type switch is found in the U.S. Pat. No. 3,086,146 which discloses a source of light directed outwards, and a photoelectric cell that responds to the light reflected back to it by an external object. The patentee claims that by using light in the red or infrared spectrum, and a detector responsive to this wavelength, the switch can be activated by a human finger, when brought over the emitter-detector pair. But this switch is inadequate for well lighted rooms, since it could be unwittingly activated by external light sources such as sunlight striking it.

In the U.S. Pat. No. 3,967,111, a circuit that eliminates interference between similar devices is described. Here, the light emitter is modulated by a sinusoidal wave of a fixed frequency; thereafter, the received signal is sent to an AND gate which correlates the signal that drives the emitter with that received by the detector. In this set-up, when the switch's own light falls on the detector, a signal results which is the same frequency as the modulation frequency. If on the other hand, the detector receives another light source, with a different frequency of course, then the AND gate detects a low frequency beat signal, which is filtered so as not to produce an output signal.

This arrangement is useful to prevent interaction between a plurality of devices, when each is assigned a different and non-harmonic frequency. But it cannot discriminate between extraneous light and its own, when the former comes from a constant source such as the sun, so its uses are limited.

SUMMARY OF THE INVENTION

The main object of this invention is to analize the input signal so as to discriminate between the switch's own characteristic output and any other continuous or intermittent source of light. Another object is to extend this test to a minimum amount of time so as to reject any spurious signal which might otherwise cause a mis-activation.

According to this invention, the emitter is modulated preferably with a low-duty cycle pulse-train. This feature not only ensures the correct operation of the circuit, but also helps to extend the life of the emitter device. Then the received signal is checked twice each cycle: once when the emitter is driven, to verify the coincidence of the signal received; and once again in the quiescent mode to ensure the anticoincidence of the received signal. The term "coincidence" as used herein is intended to mean that a first signal tests true for all active time-intervals of a second reference signal; conversely, "anti-coincidence" is defined herein as meaning that the same first signal tests false during the inactive intervals of the reference signal. The coincidence activates the output as long as the anti-corincidence confirms the absence of light in the quiescent mode; if not the anti-coincidence invalidates the output by inhibiting it, or the light emitter. This double checking is desirable for a plurality of successive cycles, so if in any of these cycles, one of these conditions is not met, the validations of the previous cycles are discarded.

The electronic circuit set forth by way of this invention for an optically activated electronic switch comprises an anti-coincidence circuit to deactivate the switch when it is struck by extraneous light. The circuit also requires a pulse generating circuit that drives the emitter and a circuit that operates synchronously with the pulse generator to provide a valid output if the phase coincidence between the emitted and received signals checks true. Preferably, the duty-cycle of the emitted pulses is very low so as to minimize the time dedicated to coincidence, and maximize that dedicated to anticoincidence, thus eliminating most chance of error in switching. In a preferred embodiment, the coincidence is activated only a very short time during the emission period, to avoid instabilities due to the various rise and fall times of the signals involved. The anti-coincidence circuit, when activated by extraneous light, can inhibit the switch by two means: it can stop the main clock, or it can block the emitter drivers. The first choice is prefered since it saves energy while it prolongs the emitter's life span, but the second alternative may be best when a plurality of opto-electronic switches is driven by one clock, such as in an optoelectronic keyboard. A further advantage due to the design of this invention, is that when the switch becomes blocked because of outside light, it does not become inoperative, since when covered by a human finger for instance, this light will be shaded and the switch will emit its own coded light pulses again.

DETAILED DESCRIPTION OF EMBODIMENTS OF THE INVENTION

Figure 1:
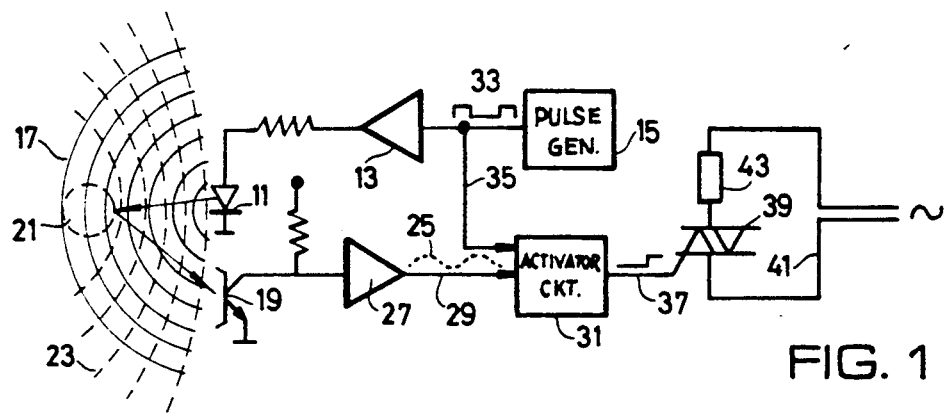
FIG. 1 shows an opto-electronic switch wherein the circuit of the invention may find application.

In FIG. 1, a source of radiation in the form of a light emitting diode 11, is energized by a driver amplifier 13 under control of a pulse generator 15. Normally, emitter 11 emits red or infrared radiation 17, which exits the switch without striking optical detector 19. Receiver 19 is preferably matched to optimise its response to the wavelength 17 propagated by emitter 11.

In operation, a person brings his finger 21 to the emitter-detector pair 11, 19, so that part of the radiation 17 is reflected back 23 to receiver 19. In response to this reflected wave 23, the detector 19 sends a signal 25 through amplifier 27, a line 29, and an activation circuit 31, successively. The purpose of the latter is to verify the coincidence of signal 25 and the pulse-train 33 of generator 15 through a first line 35; if it does verify the coincidence for a predetermined amount of successive cycles, it switches output line 37 of activation circuit 31 which changes the state of the output switching device 39. The switching device 39 is shown as a triac interconnected to the home power network 41 that feeds a load 43, for example a light, a lock, etc.

Figure 2:
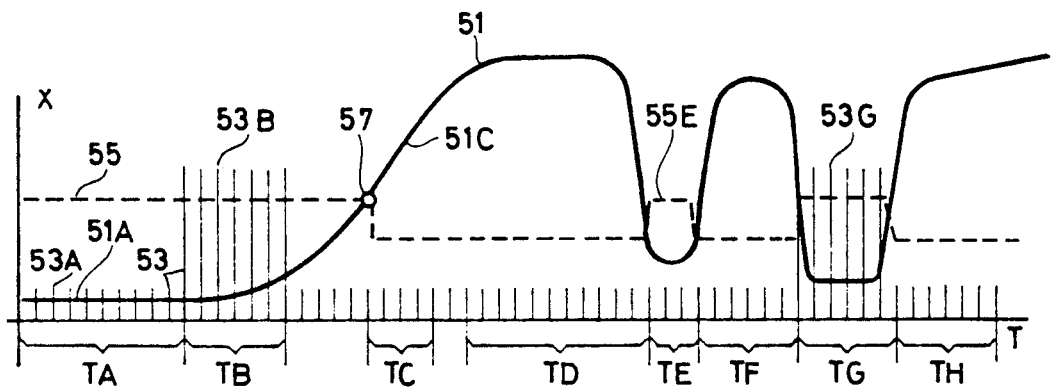
FIG. 2 is a graph that displays various signals which will be discussed.

If it weren't for solutions such as resulting from this invention, the opto-electronic switch could be activated by radiation other than that of emitter 11, for instance infrared remote controls or solar light, even while not being blocked by reflecting object 21. FIG. 2 is a graph plotting X versus T, where the vertical axis X represents the level of illumination and the horizontal axis T denotes the passage of time. Three other paramenters are also included: curve 51 showing the level of incidence of ambient (extraneous) illumination as seen by the detector 19, pulses 53 depicting the switch's own radiation reflected back to detector 19, and curve 55 representing the threshold level of activation circuit 31.

In the TA sector of the graph, detector 19 (FIG. 1) is not illuminated by extraneous light as seen by the low value 51A of curve 51, and only receives dispersed light 53A of the rays emitted by emitter 11, which have no effect since they are lower than the threshold of curve 55.

The TB area corresponds to the time the finger 21 blocks the switches so as to activate it, thus the level 53B of the pulses 53 rises significantly, surpassing the threshold and causing activation circuit 31 to change the output of the switch (normal mode).

The TC section illustrates what happens when the switch is influenced by external light and curve 51 increases to a level where it surpasses the threshold 55 at point 57. This produces an instanteous drop in the threshold due to a certain amount of hystersis, added to amplifier 27, or to activation circuit 31. If at this moment the light source is cancelled, for example by a cloud blocking the sun, it returns to its normal level, shown in TE. Thus threshold 55 resumes its standby level 55E. At TF, the same conditions as in TD are present since, following our example, the cloud has passed and the sun again shines on the faceplate of the switch.

Figure 3A:
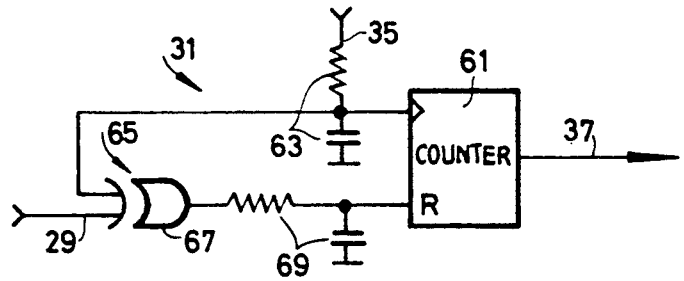
FIGS. 3A, 4 and 5A illustrate different embodiments of the validation and anti-coincidence circuits according to the present invention.
Figure 3B:
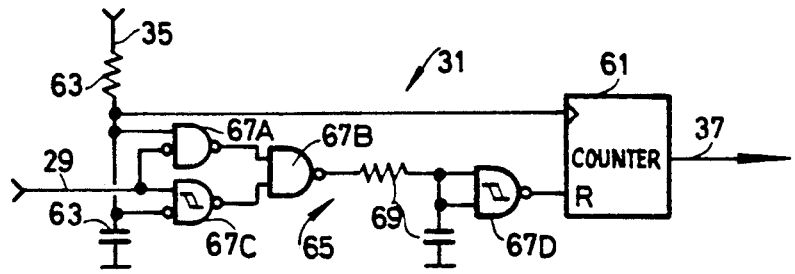
FIGS. 3B and 5B show circuits with equivalent characteristics to FIGS. 3A and 5A, respectively.

In FIGS. 3A and 3B, activation circuit 31 is time-delayed for greater reliability, by using a counter 61, for example a 4-bit binary counter, the clock input of which is connected by line 35 to generator 15 (FIG. 1). The pulse-train it receives is previously delayed by delay circuit 63, the purpose of which is to compensate the phase shift produced on the detected signal by the opto-electric path 13, 11, 17, 21, 23, 19, 27. In this manner, counter 61, counts 16 valid pulses before activating output line 37 which switches output triac 39.

One of the features of this invention is an anti-coincidence circuit 65, between line 29 from detector 19 and the reset input of counter 61 in consequence. The main job of the anti-coincidence circuit 65 is to detect the excitation of sensor 19 during the inter-pulse pauses of the driver signal 33, and reset counter 61. In FIG. 3A the anti-coincidence circuit is made up by EXCLUSIVE-OR gate 67, with one input receiving the signal from detector 19, and the other input hooked up to pulse-train 33, while the output carries the anti-coincidence signal to the low-pass band filter 69, which eliminates short signal spikes before resting counter 61 to zero. Therefore, unless counter 61 receives 16 consecutive pulses via line 35 with-out any asynchronous pulse on line 29, counter 61 will not switch output line 37.

During time lapse TF (FIG. 2), the counter 61 will be continuously reset by a complimentary pulse-train to the synchronic pulse-train 33, due to the high light level 51. When the finger 21 is brought to the optical pair 11, 19, the detector 19 is momentarily deactivated since light intensity 51 drops, as depicted in part TG of FIG. 2; at that moment, gate 67 simultaneously receives, at either input, pulses that are coincident in width and phase, so its output remains inactive. The small differences in rise and fall times, due to gate delays, etc. are filtered by circuit 69. Meanwhile, counter 61 accumulates sync pulses 33 through its clock input and, after 16 of these, it switches output line 37. When finger 21 is removed from pair 11, 19, the shadow on detector 19 disappears making level 51 resume its high value as seen in the final stage TH of FIG. 2, bringing all parameters back to where they were in stage TF.

In the embodiment shown in FIG. 3A, counter 61 counts sync pulses instead of the detected pulses from detector 19, since EXCLUSIVE-OR gate 67 does not allow pulse-train 33 to have any effect on counter 61 unless detector 19 is being activated. This happens because, in this case (TA sector of FIG. 2), both inputs of counter 61 receive virtually identical pulse-trains, the reset input having priority over the clocking input.

The circuit in FIG. 3B is another possible version of the invention, while maintaining structural and functional identity with the circuit in FIG. 3A. The anti-coincidence circuit 65 in FIG. 3B is made up by 4 AND gates 67A, 67B, 67C, 67D. Gates 67A, and 67C perform different functions: gate 67A handles the coincidence aspects of the signals since, as noted earlier, the clock input of counter 61 is not connected directly to detector 19; while gate 67C is specifically used to detect external light on detector 19 during the inter-pulse spaces of pulse-train 33. Thus, gate 67A sends a reset pulse if the detector does not respond in the period the light pulse is being emitted by emitter 11, to prevent what otherwise would be an active pulse in the clock input of counter 61. Gate 67C can only be activated by light on the receiver 19 when emitter 11 is inactive, which may only happen when said light is extraneous.

It is obvious that counter 61 must have a minimun magnitude of 2, just in case detector 19 is struck by extraneous light in the exact moment an active pulse 33 is generated, so that anti-coincidence circuit 65A has time to clear counter 61 during the following semi-cycle. Naturally, the reliability of the switch is increased in proportion with the magnitude of counter 61, as is also the slowness of the switch's response.

Figure 4:
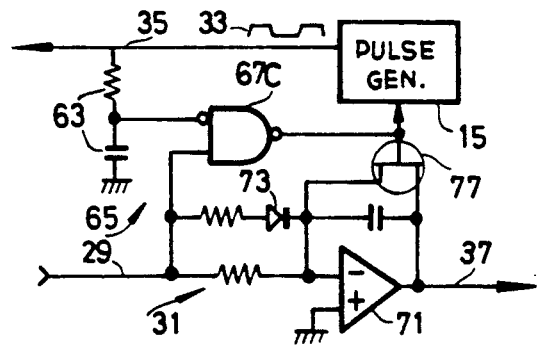

In yet another aspect of this invention, the activation circuit 31 is directly driven by detector 19 through line 29, the anti-coincidence circuit 65 responds to the asyncronous pulses that indicate extraneous light, avoiding in this way, any possibility of activation of circuit 31. FIG. 4 shows an example of this implementation.

Activating circuit 31 is centered around an integrator amplifier 71, the rise time constant of which is designed to be slow enough to integrate a certain amount of pulses from pulse-train 33 before switching output line 37. The falling-time constant of integrator 71 is greater still, because the duty cycle of pulse train 33 is preferably low. Therefore a diode 73 is included in the input of integrator 71 to provide the necessary assymetry in its rise and fall rates. In the normal mode, generator 15 produces pulses which are then converted to optical radiation by emitter 11; when detector 19 receives the reflected radiation 23 (FIG. 1), it responds by sending a similar pulse-train which is integrated for a fixed amount of time, by integrator 71 until output line 37 is activated.

The anti-coincidence circuit 65 consists of an AND gate 67C, with one input connected to detector signal 29 and the other input receives samples of driving pulse-train 33 via line 35, a delay 63 and an inverting input of gate 67C. The output of gate 67C goes to generator 15 to inhibit pulse generation when line 29 is activated during the inter-pulse pauses of pulse-train 33. This produces a stretching of these pauses as long as extraneous radiation hits detector 19, causing gate 67C to continuously inhibit generator 15. A field-effect transistor 77 prevents integrator 71 from accomplishing its specific task while generator 15 is inhibited.

Figure 5A:
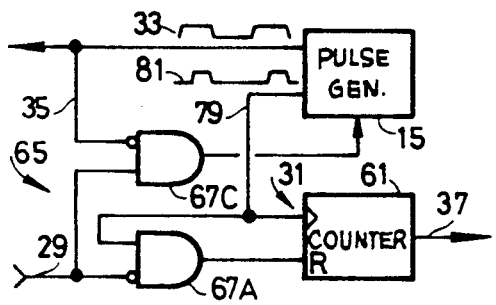

Another application of this invention is displayed in FIG. 5A. A pulse generator 15 provides 2 output lines 35, 79 outputting two pulse-trains 33, 81 of the same frequency but different pulse widths. A deliberate delay is included between the rising edge of pulses 33 of output 35, and the corresponding rising edges of pulses 81 in output 79, the former ocurring before the latter. The falling edges of these signals can be preferably made to coincide. Two examples of how to achieve this pulse generator are included in FIGS. 6A and 6B, and are described later.

In FIG. 5A, anti-coincidence circuit 65 contains AND gate 67C with inputs from lines 29 and 35, and an output which inhibits generator 15. Activating circuit 1 consists of counter 61, that receives sync pulses from generator 15 through line 79 (switch 77 in FIG. 4 is not needed here). In the presence of extraneous light on detector 19, generator 15 is inhibited and counter 61 does not receive any pulses, until the switch returns to the normal mode. It isn't necessary to shift the phase of pulse-train 33 after its sampling through gate 67C, since small transients can be ignored by generator 15. Also, because of the double pulse-train output of generator 15, filter 69 is also unnecessary (FIGS. 3 and 4), because the shorter pulses reduce the problems associated with high slew rates of wider pulses. The circuit in FIG. 5B is equivalent to that of FIG. 5A, using an integrated circuit containing 4 NOR gates to configurate gates 67A and 67C.

Figure 5B:
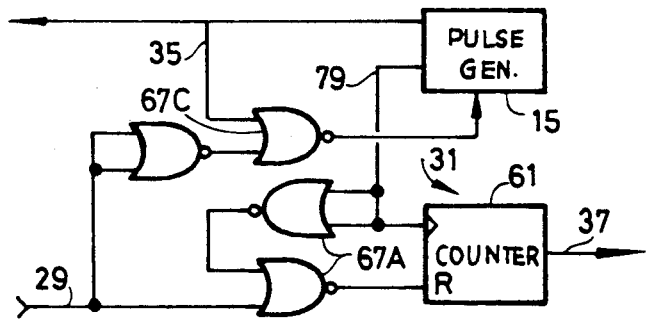
Figure 6A:
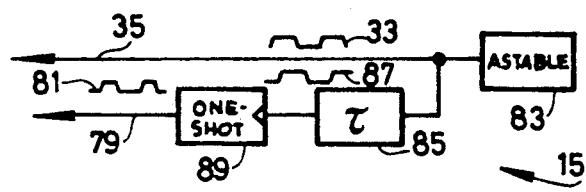
FIGS. 6A and 6B show different possible pulse generator circuits for the invention.
Figure 6B:
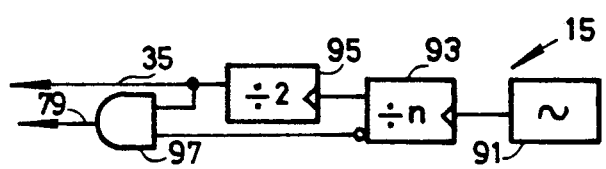

FIGS. 6A and 6B, give us two possible configurations for a double output pulse generator, for use in circuits such as in FIGS. 5A and 5B. Referring first to FIG. 6A, generator 15 comprises an astable mutivibrator 83 that provides a pulse-tran 33 through line 35. This pulse-train 33 is sent to emitter 11 to energize it; to the inverted input of gate 67C (FIG. 5) to sychronize the anti-coincidence, and to a delay circuit 85. At the output of dealy circuit 85 there is a pulse-train 87 identical in its characteristics to pulse-train 33, but shifted in phase, which is sent to the trigger input of a one-shot multivibrator 89. The time constants are determined by components 83, 85, 89 so that the pulse width 81 added to the delay of circuit 85 does not exceed the width of pulse 33. As mentioned earlier with reference to FIG. 5A, the output 79 feeds pulse-train 81 to the clock input of counter 61 and to on of the inputs of gate 67A.

In FIG. 6B, an oscillator 91 has a higher frequency than that of pulse-trains 33, 81. This oscillator feeds a divider network 93, 95, providing an output on line 35. AND gate 97 has inputs from output line 35 and a point in the divider chain 93, 95; while its output goes to counter 61 and gate 67A (FIG. 5) via line 79. As shown, it is best for the last stage 95, to be a divide-by-2 counter and that the point just mentioned be the complement (inverse) of the clock output corresponding to that final stage 95.

Although specific embodiments of this invention have been thoroughly disclosed herein, the scope of the present invention is not limited merely thereto but on the contrary may extend to other embodiments within the purview of the appended claims.

I claim:

1. In an opto-electronic switch of the reflecting type including a radiation emitter, a detector sensitive to said radiation, and an output switching device arranged to be activated when said emitted radiation is reflected by an external means from its propagation axis back towards said optical detector, an electronic circuit to prevent false activation comprising: an activation circuit, adapted to switch said output device when said optical receiver receives radiation reflected back from said emitter, a generator connected to drive said light emitter with a pulse train, and an anti-coincidence circuit connected to said optical receiver and to said pulse generator for inhibiting said activation circuit to keep the optical switch inactive when light impinges on said detector during undriven semicycles of the emitter, wherein said activating circuit comprises a counter connected to count clock pulses from said generator, to be reset by said anti-coincidence circuit and to control said output switching device for delaying activation thereof until a certain amount of consecutive pulses are counted or inhibit activation if any pulses are missing.

2. The apparatus of claim 1, wherein said anti-coincidence circuit comprises an EXCLUSIVE-OR logic gate connected to the output of said optical receiver, to the pulse output of said generator, and to the reset input of said counter.

3. The apparatus of claim 1, wherein said generator outputting a first pulse train and a second pulse train of the same fundamental frequency, the first pulse train driving said emitter and the second pulse train clocking said counter, the second pulse train comprising pulses of narrower width relative to the first pulse train and occurring in time inside the time width of the first train pulses.

4. The apparatus of claim 2, wherein said counter comprises a low-pass band filter before its reset input to eliminate transient pulses.

5. In an opto-electronic switch of the reflecting type including a radiation emitter, a detector sensitive to said radiation, and an output switching device arranged to be activated when said emitted radiation is reflected by an external means from its propagation axis back towards said optical detector, an electronic circuit to prevent false activation comprising: an activation circuit, adapted to switch said output device when said optical receiver receives radiation reflected back from said emitter, a generator connected to drive said light emitter with a pulse train, and an anti-coincidence circuit connected to said optical receiver and to said pulse generator for inhibiting said activation circuit to keep the optical switch inactive when light impinges on said detector during undriven semicycles of the emitter, wherein said activation circuit comprises an integrating amplifier with a rise-time lower than its fall time and greater than the period of said pulse generator, said integrator connected to receive signals from said detector and to control said output switching device; and said anti-coincidence circuit comprising a logical AND gate connected to receive both signals from the detector and pulses from the generator, for inhibiting both said generator and said integrator in response to said AND gate simultaneously being subjected to true detector and false generator levels.

6. The apparatus of claim 5, wherein said generator outputting a first pulse train and a second pulse train of the same fundamental frequency, the first pulse train driving said emitter and the second pulse train clocking said counter, the second pulse train comprising pulses of narrower width relative to the first pulse train and occurring in time inside the time width of the first train pulses.

* * * * *